UNITED STATES PATENT OFFICE.

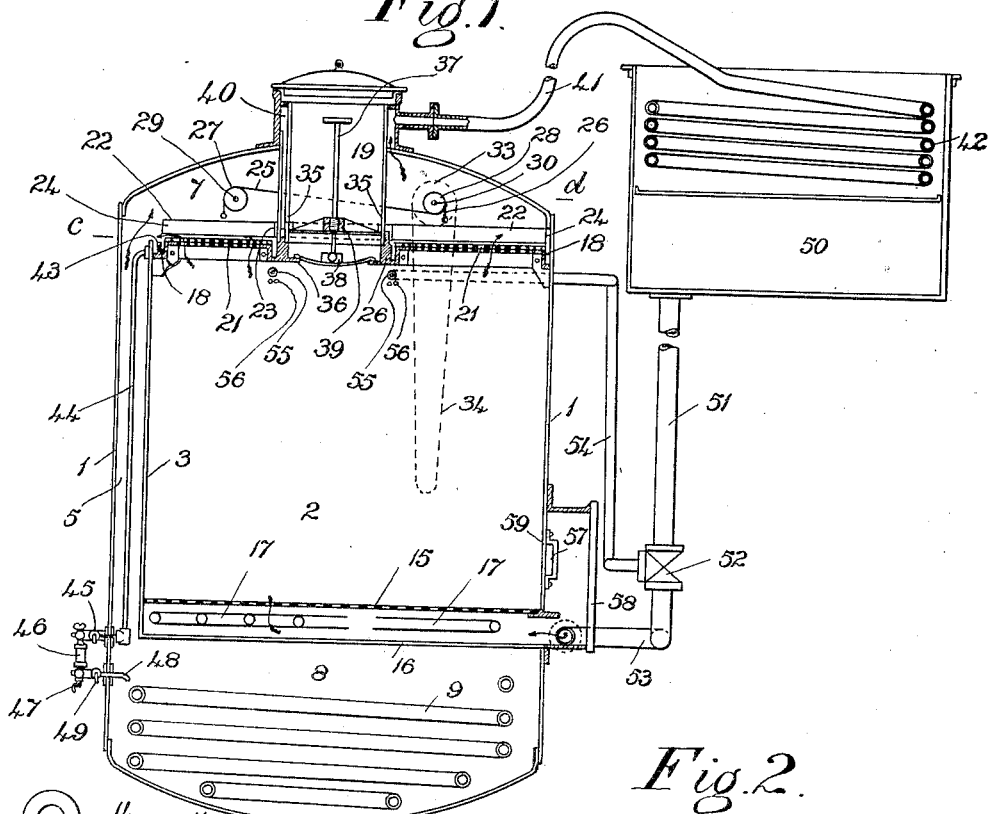
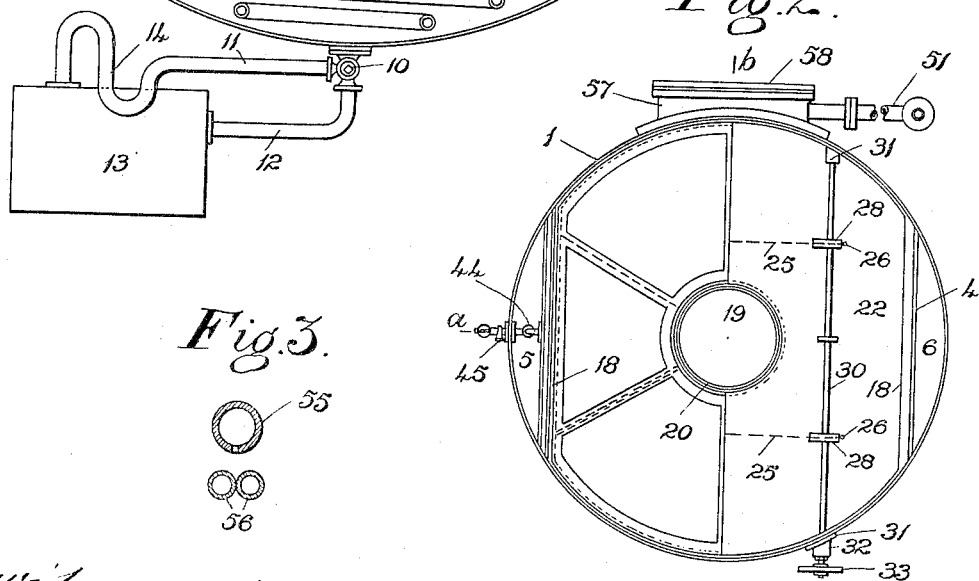
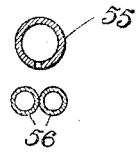

LOUIS JOHN SIMON AND JOHN WILLIAM HINCHLEY, OF LONDON, ENGLAND, ASSIGNORS OF ONE-THIRD TO STANDAR CHEMICAL ENGINEERING COMPANY, LIMITED, OF LONDON, ENGLAND.

APPARATUS FOR EXTRACTING OILS, FATS, GREASE, WAX, INDIA-RUBBER, SULFUR, AND OTHER SUBSTANCES SOLUBLE IN ORGANIC SOLVENTS FROM MATERIALS CONTAINING THE SAME.

1,381,758.  Specification of Letters Patent.  Patented June 14, 1921.

Application filed April 10, 1919. Serial No. 289,075.

*To all whom it may concern:*

Be it known that we, LOUIS JOHN SIMON and JOHN WILLIAM HINCHLEY, subjects of the King of Great Britain, residing at London, England, have invented certain new and useful improvements in the construction of apparatus for extracting oils, fats, grease, wax, india-rubber, sulfur, and other substances soluble in organic solvents from materials containing the same, of which the following is a specification.

This invention relates to known apparatus for the extraction of oil, fat, grease, gelatin, and substances generally which are soluble in organic solvents, from materials containing the same.

The extraction of the above mentioned oil, fat, grease, etc., is usually effected in a vessel under the influence of heat and action of solvents, fumes, steam or the like.

This invention provides for improvements in the known construction, in which it has been found impracticable to use efficiently either heavy or (and) light solvents in the one apparatus as desired.

The known construction referred to, comprises an extractor having a cylindrical and vertically arranged vessel divided in three chambers, the upper chamber being the receptacle for the material to be treated, having a charge door at the top and a discharge door at the lower portion, the lower chamber being the still containing steam coils, and in between the upper chamber and the still is a space open to the upper chamber through a strainer, but sealed from the still.

The operation of this type of extractor is that the solvent is fed from the tank containing the same to the upper chamber containing the material to be treated. The solvent which has been heated is run off from the material in the upper chamber through the strainer into the still, by means of pipe and cock and in running off carries with it the extracted substances. The solution is then subjected to a high temperature by means of the coils in the still already referred to, and distillation of the solution takes place, the solvent passing in the form of a vapor to the condenser, and then through the separator to the storage or reservoir tank the extracted substances remaining in the still.

In this known type of extractor, the only means of the removal of the solution is through the strainer provided in the intermediate space between the upper and the lower chamber, from which space it is then fed to the lower chamber or still. From this it will be seen that when a solvent which is heavier than the extracted substance is used the solution rises to the top of the solvent, and then has to be drawn back through the material, and in the process the material re-absorbs a considerable percentage of the substance already extracted.

This invention provides for straining at the top of the apparatus and for feeding the solvent below the material, and at the same time heating the solvent as it enters, and by this means heated solvent in rising in the upper chamber dissolves the substance to be extracted and at the same time the solution being lighter than the solvent the solution remains at the top of the solvent throughout the extraction, and as a strainer is provided at the top of the apparatus, the solution overflows through this strainer to the still, without having to be re-drawn down through the material under treatment as in the case of the known construction of this type in which an upward flow of solvent for extraction is employed.

From the foregoing, it will be seen that an exceptionally high percentage of substance to be extracted will be removed on the one upward flow of heavy type of solvent, and in experiment this has proved to be as high as 90% of the total contained in the material as against 60% even after 3 or 4 flushes in the known apparatus. In the known apparatus, it is necessary to distil off the whole of the solvent before the extractor could be emptied and re-charged with the material to be treated but in this invention a means is provided for sealing the upper chamber, and separating it from the lower, enabling the apparatus to be re-charged while the distillation of the solvent whether heavy or light is still proceeding. This also serves an additional purpose, viz., that after the first upward flush of heavy solvent or downward flush when light solvent is used during which is carried off the greater portion of the substance to be treated, it is possible to distil off the solvent and by means of a seal provided below the still remove the extracted substance without the risk of air entering the extractor. The solution above referred to contains a comparatively small quantity of solvent, and need therefore only be subjected to the heat of the heating coils for a minimum amount of time. In the known type of extractor which requires several flushes of solvent to complete the extraction, the solution which necessarily contains a very large quantity of solvent has to remain in the still until all the fractions of the solvent have been distilled off.

On this account burning or discoloration of the oil takes place and emulsification in the presence of water, defects which are completely obviated in the invention.

In our invention when dealing with heavy solvents after the first upward flush above referred to, a downward flush is made for the purpose of emptying the upper chamber when the solvent is led through the bottom strainer and a valved pipe to the still carrying with it the remaining traces of the substance to be extracted.

By this invention an apparatus is constructed for extracting oil, fat, grease, wax, india rubber, sulfur and other substances soluble in organic solvents from materials containing or yielding the same embodying means whereby an upward or downward or both upward and downward flow of the solvent can be created, a straining of the material is effected from the top of the extracting vessel and (or) from the bottom and when desired sighting and ascertaining the solution or mixture coming from the extracting vessel without interfering with the operations in progress, a sealing of the extractor vessel from other parts of the apparatus while the extractor is being filled or emptied or otherwise engaged and to seal the draw off pipe and prevent air entering the apparatus when removing the extracted substance from the apparatus.

The invention will be clearly understood from the following description aided by the annexed drawings in which—

Figure 1 is a sectional elevation of the apparatus on the lines A, B of Fig. 2 but in actual construction. The condenser shown on the right hand side of the figure is positioned higher or above the other portion, the gearing for lifting the lid being shown as in an ordinary vertical section.

Fig. 2 is a sectional plan on the line c. d. of Fig. 1 with parts removed.

Fig. 3 is an enlarged sectional view of the solvent distributing pipe and the heating pipes used for downward flow of the solvent.

1 is the casing having within it a chamber or extracting vessel 2 this being formed from the wall of the casing 1 and separate walls 3, 4 attached to the casing 1 and forming passages 5, 6 on opposite sides, such passages 5, 6 being open top and bottom so as to form passage ways between the top space 7, and the bottom space or distilling chamber 8 formed in the lower part of the casing 1.

The lower part 8 of the casing is provided with a coil or series of coils of piping 9 through which steam is passed as a heating medium and an outlet is formed in the bottom of the casing 1 leading through a two way tap 10 and pipes 11, 12 to an oil tank 13 the pipe 11 being bent at 14 to form a seal.

At the lower part of the extracting vessel 2 is positioned a perforated plate wire gauze or equivalent false bottom 15 and between this and the bottom proper 16 of the extracting vessel 2 is positioned a coil or series of coils of piping 17 heated by steam.

The upper part or top of extracting vessel and around its edge is provided with U shaped trough 18 and at the center of such upper portion is positioned a tube 19 leading through the upper part of the casing 1 and outside of same, such tube 19 forming the means through which the extracting vessel is filled with the material to be treated.

Surrounding this tube 19 is a U shaped ring 20.

A straining cloth 21 or its equivalent is placed between the two U shaped rings 18, 20.

Above the strainer cloth 21 a lid 22 is provided having downwardly extending flanges 23, 24 so that when the lid 22 is lowered in the U shaped channels 18, 20 the latter become filled with highly concentrated and viscous solution which seals or shuts off the extractor vessel 2 from the other parts of the apparatus.

This lid 22 is supported by chains or ropes 25, 26 passed over pulleys 27, 28 the pulleys being on shafts 29, 30 journaled in brackets 31 secured to the casing 1, one end of the shaft 30 being passed outside the apparatus through a stuffing box 32 and carrying a wheel 33 having a chain 34. The ropes or chains 25 are secured to the pulleys 28 so that on actuation by the chain 34 of the shaft 30 all ropes or chains move equally and the lid will be raised or lowered perfectly level as will be understood.

The interior of the tube 19 is provided with lugs 35, 35 and its interior bottom edge is provided with a curved flange 36.

The means for sealing this tube consists of a handled rod 37 carrying at its lower end by a ball and socket joint a plate 38 having a downwardly curved edge and at some portion of the length of the rod 37 is positioned a screw thread engaging a screw threaded hole of a bar 39 which is provided with means or formed U shaped to engage the lugs. In sealing the tube 19 the rod 37 with its plate and bar somewhat close together are lowered into the tube and the upwardly opening U ends of the bar 39 are caused to engage the lugs 35 when by holding the rod so that the bar keeps in engagement with the lugs and turning the rod 37 the screw will cause the plate or lid 38 to lower and its curved edge to engage the flange 36 and the whole will become fixed in the tube 19 and close same and if a packing is provided in the curved flange 36 a perfect seal is obtained.

The casing 1 is provided with an extension 40 surrounding the upper part of the tube 19 and from such extension 40 is a pipe 41 leading to a condenser 42 which is positioned at a greater height than the top of the casing 1.

On the edge of the opening 5 is positioned another channel 43 from which a pipe 44 is led down through the chamber 5 and outside the casing 1 where it is connected to a branch pipe carrying a top 45 to which is connected a vertical sight tube (glass) 46 this being connected to a draw off tap 47 having a branch pipe 48 leading into the distillation chamber 8, such pipe 48 having a tap 49 positioned outside the casing 1.

Underneath the condenser 42 is the solvent tank 50 from which a pipe 51 is led to a two way tap 52 this opening to a pipe 53 leading into extractor vessel 2 below the perforated bottom 15, or to a pipe 54 leading to a perforated pipe ring 55 positioned at the upper part of the extracting vessel 2 and around the tube 19, such tube 55 (see Fig. 3) having two steam pipes 56, 56 arranged close together so that the solvent emanating from the tube 55 will fall on the tubes 56, 56 and be heated by them and also be spread in spray or film form over the material in the extractor vessel 2.

Between the plates 15, 16 is an outlet pipe (not shown) controlled by a valve leading into the lower portion of the still 8 to allow the solvent and extracted material to pass into the still 8 when downward flushes are made and for emptying the chamber 2 of solvent after the upward extraction has been completed.

The lower part of the extracting vessel 3 is provided with an extended outlet 57 having a door 58 on the outside, and a door 59 coinciding with the casing 1 so that the extractor vessel 2 is completely sealed and this allows of the pipe 53 having an entrance into the extension 57 and by the door 59 the solvent is compelled to pass through the false bottom 15 to act upon the material therein contained.

In operation the lid 22 is first lifted and the extractor 2 is then filled with oil, fat, grease, etc., bearing material and the lid 38 with the bar 39 and rod 37 are placed in the tube 19 and the bar caused to engage the lugs 35. The rod 37 is then turned to force the lid 38 into the groove 36 to form a seal and tight joint and the doors 57, 59 closed.

For upward flow of the solvent the tap 52 is turned for the solvent from the tank 50 to flow through the pipe 53 into the extractor 2 where it passes upward through the material acting upon same to extract the oil, fat, greases, etc., which passes upward and floats upon the top and as the solvent rises in the extractor the oil will be passed through the strainer cloth 21 and flow over the edge of the extractor 2 and fills the channel 18 flowing on one side into the channel 43 and down the pipe 44 which it fills and on turning the tap 45 flows into the glass tube 46 where it can be seen and by turning on the tap 47 can be drawn off so as to ascertain the quality or specific gravity of the oil, fat, grease, etc., at the start or at any time during the process of extraction and to obtain a fresh supply during the progress of extraction. Oil, fat, grease, etc., in the pipe 44 can be passed into the distilling chamber by closing the tap 47 and opening the taps 45, 49 whereby a flow is created through the piping into the distilling chamber and at any time by turning off the tap 49 a new supply can be obtained. The main portion of the oil passing through the strainer cloth 21 passes down the openings 5, 6 into the distilling chamber 8 where the solvent is vaporized by the heat of the steam coil 9 and such vapors pass up the openings 5, 6 as also any vapors from the extractor 2 freed by the heat of the steam coil 17 and away through the top of the casing and by the pipe 41 to the condener 42, which condenser is positioned at a higher level than the top of the casing, the process being continued until no further oil, fat, grease, etc., can be extracted.

On this being found out the supply of solvent is cut off and to allow of the distillation being continued while the extractor is being emptied and recharged or otherwise engaged the lid 22 is lowered and its edge fitting in the channels 18, 20 will effectually seal the extractor 2 from the distilling chamber 8 and casing top and by opening the doors 59, 57 the contents can be discharged and the extractor refilled through the tube 19 and after refilling the extractor and closing the tube 19 and the doors 59, 57 the operation is continued.

When it is desired to give the solvent a downward flow the tap 52 is turned for the solvent to flow through the pipe 54 to the perforated pipe 55 where the solvent falls on to the steam pipes 56 and flows over on to and through the material.

The oil is drawn off from the distilling chamber 8 by tap 10 and through the pipe 12 into the tank 13 or the tap 10 is turned to the pipe 11 and that containing a seal 14 will effectually seal the tank 13 and distiller 8 from any air passing to the apparatus.

What we do claim as our invention, and desire to secure by Letters Patent is:—

1. An apparatus for extracting oil, fat, grease, wax, india rubber, sulfur and other substances soluble in organic solvents from material containing or yielding the same, comprising a vessel having an extractor and a distiller positioned therein, said extractor being spaced from the top of the vessel, a charging tube extending through said top space, mechanism for sealing said tube, a discharge door in the lower portion of said extractor, a strainer positioned around said tube, a condenser tube communicating with said top space, means affording communication between said distiller and top space so that the overflow from the extractor may pass to said distiller, a lid adapted to cover said strainer and seal the extractor from the distiller without closing said means of communication, whereby vapors from the distiller may pass to the top space and condenser tube even though the lid is in closed position.

2. An apparatus for extracting oil, fat, grease, wax, india rubber, sulfur and other substances soluble in organic solvents from material containing or yielding the same, comprising a vessel having an extractor and a distiller therein, said extractor having a strainer at the top thereof, a permanently fixed charge door on the top and a discharge door in the lower portions of said extractor, means for by-passing a portion of the solution passing through the upper strainer and to the distiller, for sighting and taking samples of the same.

3. An apparatus for extracting oil, fat, grease, wax, india rubber, sulfur, and other substances soluble in organic substances from material containing or yielding the same, comprising a vessel having an extractor and distiller therein, said extractor having a strainer at the top thereof, a trough arranged adjacent to said strainer, a permanently fixed charge door in the top and a discharge door in the lower portion of said extractor, a passage-way formed between the extractor and one of the walls of the vessel whereby the oil, fat, grease, etc., passing through the said strainer and overflowing from said trough may pass to the distiller and a by-pass connected with said trough whereby a sample of the solution passing through the upper strainer may be obtained.

4. An apparatus for extracting oil, fat, grease, wax, india rubber, sulfur and other substances soluble in organic solvents from material containing or yielding same, comprising a vessel, an extractor and a distiller in said vessel, said extractor having a permanently fixed charge door in its top and a discharge door in its lower portion, a strainer in the upper part of said extractor, means for sealing the extractor vessel from the distilling vessel, said means comprising an externally controlled lid portion positioned adjacent said strainer.

5. Apparatus for extracting oils, fats, grease, wax, india rubber, sulfur and other substances soluble in organic solvents, a vessel, an extractor and a distiller positioned in said vessel, internal partitions between said extractor and said distiller, said partitions being formed with openings, valved connections between said extractor and said distiller, strainers in the top and bottom portions of said extractor, means positioned at the top of the extractor for sealing the openings in the top of the partition between the extractor and the distiller, means for sighting and taking samples of the extracted fluid after it has passed through the upper strainer, means for heating the lower part of the vessel, a solvent tank, connections between said solvent tank and the upper portion and the bottom portions of said extractor, means for heating the solvent bath at the bottom and the top of said extractor, means for sealing the extractor, a condenser communicating with the top of the vessel, and outlet pipes at the bottom of the vessel for the extracted material.

In testimony whereof we have hereunto set our hands in presence of two subscribing witnesses.

LOUIS JOHN SIMON.
JOHN WILLIAM HINCHLEY.

Witnesses:
 WALTER U. FISCHER,
 JOHN VINCENT CROSS.